Nov. 28, 1967 G. C. HARRISON 3,355,196

SMOOTH JOINT FOR STRUCTURAL SHEETS AND MEMBERS

Filed Dec. 13, 1965

INVENTOR.
GEORGE C. HARRISON
BY
Carpenter, Kinney & Boulter
ATTORNEYS

United States Patent Office 3,355,196
Patented Nov. 28, 1967

3,355,196
SMOOTH JOINT FOR STRUCTURAL SHEETS
AND MEMBERS
George C. Harrison, Roseville, Minn., assignor to Minnesota Mining and Manufacturing Company, St. Paul, Minn., a corporation of Delaware
Filed Dec. 13, 1965, Ser. No. 513,369
7 Claims. (Cl. 287—20.92)

ABSTRACT OF THE DISCLOSURE

A strong, flexible joint for plywood panels or dimension lumber, the joint having a central cut-out portion in each of the two abutting edges, the cut-out portion being filled by a spline which traverses the joint, and there being interfitting mortises and tenons on either side of the cut-out, the contacting surfaces of the spline, the tenons, and the mortises, being adhesively bonded together preferably with a flexible, substantially solvent-free elastomeric adhesive, such as a polyurethane or epoxy resin, the mortises and tenons on each side of the joint fitting together to form continuous surfaces.

---

This invention relates to joints for abutting panels. More specifically the invention relates to joints for edge-to-edge jointing of sheets of plywood or the like.

Due to limitations in the peeling operation in which the plies are formed in the manufacture of plywood, four by eight sheets are standard; sizes as large as five by nine and four by twelve are available only on special order. Although larger sheets would be desirable in the fabrication of such items as mobile homes, commercial refrigeration, prefabricated homes, farm buildings, large outdoor signs, van boxes, truck-trailer linings, and the like, insofar as I am aware, no commercially feasible means of joining smaller panels into larger sheets in which the joint is at least equal to the strength of the panels in the cross-grain direction has been available prior to the present invention.

The present invention provides a means of joining abutting panels to provide strong continuous sheets. The invention further provides smooth joints which require only light sanding to result in a continuous smooth surface on both sides which can be easily covered for aesthetic purposes with paint, wall paper, plastic film having wood grain or other printing thereon and the like.

The invention further provides a practical means for joining smaller pieces to form dimension lumber without downgrading the strength of the resulting piece.

The invention will be further pointed out with reference to the accompanying drawings wherein.

Figure 1:
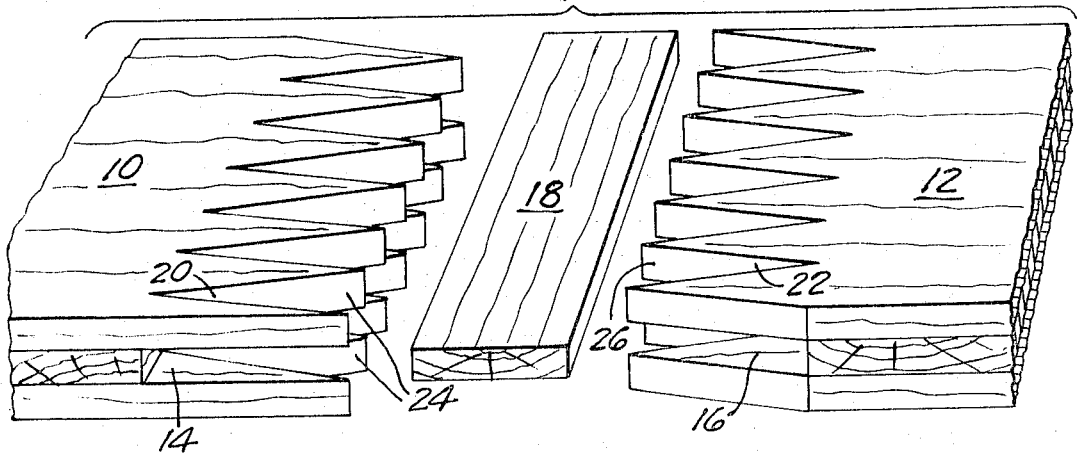
FIGURE 1 is a perspective view showing the parts of a joint of the present invention prior to assembly with pieces broken away.

Referring more particularly to the drawings, there are shown in FIGURE 1 abutting panels of 10 and 12 of plywood or the like which are provided with cut-out portions 14 and 16 along the central portions of their respective abutting edges. A spline 18 is also provided having a size and shape to fill the cut-out portions when the parts of the joint are assembled. The abutting edges of panels 10 and 12 are further provided with alternating mortises 20 and 22 and tenons 24 and 26, respectively, cut so that they will interfit to form a tight joint. The preferred shape of the mortises and tenons is a sharp saw-tooth like configuration of the type shown in the drawings. It will be apparent to those skilled in the art that other configurations, for example, teeth having blunt, rounded or other shaped ends are also feasible and can be substituted. Sharp ended tenons, however, appear to be less subject to delamination at the ends thereof on flexing of the panel than other configurations and thus are particularly preferred in applications in which the panel is intended to be flexed.

Figure 2:
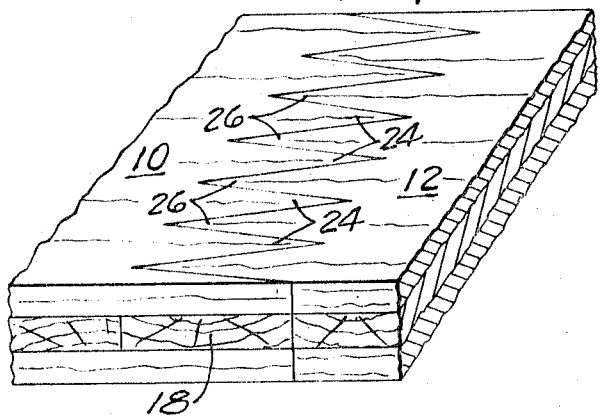
FIGURE 2 shows the parts shown in FIGURE 1 assembled into a joint.

The contacting surfaces of the mortises 20, 22 and tenons, 24 26 and the spline 18 are coated with an adhesive of a character hereinafter set forth and assembled as shown in FIGURE 2 to form a joint. After a period of time sufficient to permit the adhesive to cure, the strength of the panel along the joint is found to be equal to that of the remainder of the assembled panels. It is preferred to have the wood grain of the outer plies run in the direction of the mortises and tenons as shown in order to provide maximum strength to the joint.

Figure 3:
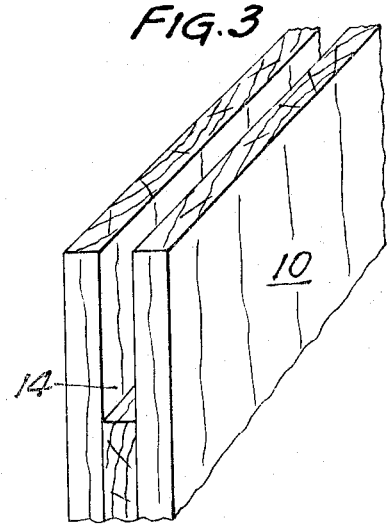
FIGURE 3 shows a step in the procedure for making a joint.
Figure 4:
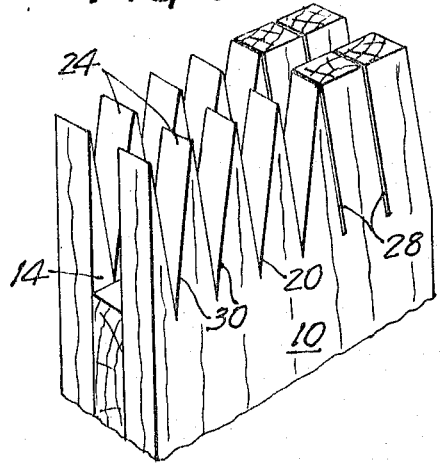
FIGURE 4 shows further steps in the procedure for making a joint of the present invention.

In FIGURE 3 is shown a panel edge having a cut out central portion 14 prior to the formation of the mortises and tenons along the edge. Cut-out portion 14 can readily be formed by routing out the central ply or other desired portion of a sheet using conventional wood cutting tools, or alternatively, the plywood sheets can be formed having the center ply of a shorter length than the outer plies so that the routing operation is eliminated. While the cut-out portion and splines are illustrated as being rectangular in configuration, other shapes may be used. For example, the edges of the cut-outs and splines may be tapered.

The mortises and tenons are formed along the panel edge using a suitable wood cutting device preferably with the aid of a jig or other guide means in order to form precisely located cut lines. To form sharp teeth of the type shown in the drawings it is expedient to first cut parallel lines 28 at an angle with the panel edge and then to cut out the mortises 20 by forming further parallel cut lines 30 thus leaving tenons 24 projecting from the edge of the panel.

While the application of the invention is illustrated in the drawings for plywood having three plies, it will be understood that the invention is equally applicable to plywood having more plies or to other types of materials. For example lengths of conventional dimension lumber can be joined by the use of the joints of the present invention. The joint can also be adapted for use onto laminates such as those formed from chip board with a facing of veneer on the surfaces. Further embodiments will be apparent to those skilled in the art.

In order to form strong, flexible joints it is important that a resilient, flexible, elastomeric adhesive be used, as it has been found that brittle adhesives of the type conventionally used in adhering the plies in forming plywood fail at low stresses when used with the joints of the present invention. A further desirable characteristic of the adhesive is that it be 100% solids in the curable state. It has been found that if rubber-based adhesives carried by a volatile solvent are used the adhesive will tend to honeycomb upon drying of the solvent and the resultant joint will have considerably less than the optimum strength. The two preferred types of adhesives are low temperature curing polyurethanes and flexibilized epoxy compositions.

The preferred polyurethane adhesives are catalyzed "one shot" reaction mixtures containing an organic isocyanate and an active hydrogen-containing material.

Suitable polyurethane compositions are disclosed, for example, in U.S. Patent 3,201,136 to Harrison et al., issued Aug. 17, 1965, and are two-part systems in which the two parts are mixed to initiate the reaction shortly before use. Part A comprises a hydroxyl-containing material preferably a polyalkyleneether glycol and/or more functional polyol such as a triol to provide crosslinking in the product. This part A may also contain an amine such as 4,4′-methylene bis(2-chloroaniline). Part B contains an organic diisocyanate, for example, toluene diisocyanate, and, if desired, a small proportion of polyol to assist mixing. Parts A and B are mixed to provide a slight excess of diisocyanate which appears to chemically react with the hydroxyl groups in the adjacent surface portions of the lignocellulosic substrate thereby forming a strong tenacious bond. A catalyst for the hydroxyl-isocyanate reaction is added, generally to Part A, to cause the reaction to proceed rapidly at ambient temperatures.

The following examples will serve to further illustrate the invention. All parts are by weight unless otherwise noted.

*Example I*

Two sheets of three-ply plywood were selected and the edges to be joined were routed out to a depth of two inches. Saw-tooth shaped mortises and tenons were formed along the edges having a size and shape such that they would inter-fit when the panels were placed into abutting relation. A two-inch wide spline having a thickness of the routed out portion and a length equal to the width of the panels was formed. The spline and the contacting surfaces of the mortises and tenons were coated with a polyurethane adhesive of the following composition.

Part A

| | Parts |
|---|---|
| Polypropylene ether glycol (2000 M.W.) | 322.0 |
| 4,4′-methylene bis(2-chloroaniline) | 42.0 |
| Catalyst (usually an organo-metallic compound or metal organic salt or mixture thereof) | 2.4 |
| Fillers, preservatives, and other additives | 33.6 |

Part B

| | |
|---|---|
| Toluene diisocyanate | 62.3 |
| Polypropylene ether glycol (400 M.W.) | 31.4 |
| Polypropylene ether triol (400 M.W.) | 6.3 |

Parts A and B were mixed in a ratio of 100 parts A to 26.5 parts B and used immediately after mixing. The parts of the joints were assembled and the adhesive allowed to cure. The curing was sufficiently completed after a period of 1 hour for general handling and to provide a joint having full strength after 24 hours. The assembled sheet when tested failed along a line perpendicular to the joint.

*Example II*

An example of a flexible epoxy composition suitable for forming joints of this invention is:

Part A

| | Parts |
|---|---|
| Reaction product of 1 mole bisphenol A with 2 moles epichlorohydrin | 50 |
| Talc and pigment | 50 |

Part B

| | |
|---|---|
| Reaction product of 1 mole dimerized acid with 2 moles ethylene diamine | 39 |
| Diethylene triamine | 1.5 |
| Plasticizer (54% chlorinated diphenyl—Monsanto Aroclor 1354) | 10 |
| Talc | 46 |
| Bentonite | 4 |

Parts A and B are mixed in equal amounts.

What is claimed is:

1. A panel joint comprising a pair of edge-abutted panels, each panel having a plurality of alternate mortises and tenons along its abutting edge, the mortises and tenons of the two panels being in staggered relation and interfitting, a central portion of each edge being cut away throughout substantially the entire length thereof to define a cut-out portion having mortises and tenons on either side thereof, the depth of said cut-out portions being at least substantially equal to the length of said tenons, the cut-out portions of the abutting panels being in alignment, a spline traversing said joint and substantially filling said cut-out portions, contacting surfaces of said spline, said tenons, and said mortises being bonded to each other by a flexible adhesive.

2. A joint for plywood panels comprising a pair of edge-abutted panels, each panel having a plurality of alternate tooth-like mortises and tenons along its abutting edge, the mortises and tenons of the two panels being in staggered relation and interfitting, aligned edge portions of internal plies of each panel being cut away all along the extent of said edges to a depth at least substantially equal to the length of said mortises and tenons, a spline shaped to fit into said cut away portions traversing said joint, contacting surfaces of said spline, said tenons and said mortises being bonded to each other by a resilient, flexible adhesive.

3. The joint of claim 1 wherein the adhesive bond is formed by a crosslinked polyurethane elastomer, said panels being of wood, said elastomer being chemically reacted with surfaces of the wood forming said joint.

4. The joint of claim 1 wherein the adhesive bond is formed by a flexibilized epoxy composition.

5. The joint according to claim 1 wherein said tenons and mortises are sharply pointed.

6. A joint for structural members comprising a pair of abutting structural elements, each element having a plurality of alternate mortises and tenons along its abutting edge, the mortises and tenons of the two panels being in staggered relation and interfitting, a central portion of each edge being cut away throughout substantially the entire extent thereof to define a cut-out portion having mortises and tenons on either side thereof with the depth of said cut-out portion being substantially equal to the length of said tenons, the cut-out portions of the abutting panels being in alignment, a spline traversing said joint and substantially filling said cut-out portions, contacting surfaces of said spline, said tenons, and said mortises being bonded to each other by a resilient elastomeric adhesive.

7. A joint according to claim 6 wherein the tenons on opposite sides of said cut-out are aligned with each other in pairs, and have parallel edges.

References Cited

UNITED STATES PATENTS

| 1,210,688 | 1/1917 | Pierce et al. | 287—20.92 |
| 1,496,175 | 6/1924 | Schafer | 287—20.92 |
| 3,074,448 | 1/1963 | Brown | 287—20.92 |
| 3,262,723 | 7/1966 | Strickler | 287—20.92 |

FOREIGN PATENTS

| 843,330 | 3/1939 | France. |
| 166,686 | 1/1934 | Switzerland. |

CARL W. TOMLIN, *Primary Examiner.*

R. S. BRITT, *Assistant Examiner.*